United States Patent
Cheng et al.

(10) Patent No.: US 10,069,793 B2
(45) Date of Patent: Sep. 4, 2018

(54) IDENTITY VERIFICATION METHOD, INTERNET OF THINS GATEWAY DEVICE, AND VERIFICATION GATEWAY DEVICE USING THE SAME

(71) Applicants: Tatung Company, Taipei (TW); TATUNG UNIVERSITY, Taipei (TW)

(72) Inventors: Fu-Chiung Cheng, Taipei (TW); Po-Chung Chang, Taipei (TW); Tai-Jee Pan, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 286 days.

(21) Appl. No.: 14/957,602

(22) Filed: Dec. 3, 2015

(65) Prior Publication Data

US 2017/0063823 A1 Mar. 2, 2017

Related U.S. Application Data

(60) Provisional application No. 62/210,421, filed on Aug. 26, 2015.

(51) Int. Cl.
*H04L 29/06* (2006.01)
*H04W 12/06* (2009.01)
(Continued)

(52) U.S. Cl.
CPC .......... *H04L 63/0227* (2013.01); *H04L 63/08* (2013.01); *H04W 12/06* (2013.01);
(Continued)

(58) Field of Classification Search
CPC ............. H04L 63/0245; H04L 63/0227; H04L 63/0236; H04L 63/0254; H04L 63/1408
(Continued)

(56) References Cited

U.S. PATENT DOCUMENTS 7,484,011 B1   1/2009  Agasaveeran et al.
8,510,803 B2   8/2013  Gronholm et al.
(Continued)

FOREIGN PATENT DOCUMENTS

CN   102572780   7/2012
JP   201625598   2/2016
(Continued)

OTHER PUBLICATIONS

"Office Action of Taiwan Counterpart Application," dated Jun. 21, 2017, p. 1-p. 10, in which the listed references were cited.
(Continued)

*Primary Examiner* — William S Powers

(74) *Attorney, Agent, or Firm* — JCIPRNET

(57) ABSTRACT

An identity verification method, an IoT gateway device, and a verification gateway device using the same are provided. According to the provided method, the IoT gateway device firstly establishes a look-up table including a valid MAC address list and a valid RSSI range of at least one valid client device. When the IoT gateway device receives the connection request sent from the client device, the IoT gateway device may obtain the MAC address and a RSSI value of the client device according to the connection request and compare the received MAC address and the received RSSI value with the valid MAC address list and the valid RSSI range, so as to determine whether the client device is the valid client device.

15 Claims, 6 Drawing Sheets

(51) Int. Cl.
*H04W 76/10* (2018.01)
*H04W 12/08* (2009.01)
*H04W 48/20* (2009.01)
*H04W 88/16* (2009.01)
*H04W 84/04* (2009.01)

(52) U.S. Cl.
CPC ............ *H04W 12/08* (2013.01); *H04W 48/20* (2013.01); *H04W 76/10* (2018.02); *H04W 84/04* (2013.01); *H04W 88/16* (2013.01)

(58) Field of Classification Search
USPC .......................................................... 726/13
See application file for complete search history.

(56) References Cited

U.S. PATENT DOCUMENTS

| | | | |
|---|---|---|---|
| 8,707,432 | B1 | 4/2014 | Rathi et al. |
| 8,937,968 | B1* | 1/2015 | Venkatesh ............ H04W 16/04 370/431 |
| 9,439,169 | B2* | 9/2016 | Irigi ...................... H04W 68/02 |
| 2003/0108009 | A1* | 6/2003 | Petersen ................ H04W 76/14 370/332 |
| 2007/0082656 | A1* | 4/2007 | Stieglitz .................. H04L 63/08 455/411 |
| 2007/0143827 | A1* | 6/2007 | Nicodemus .......... G06F 21/6218 726/2 |
| 2012/0163177 | A1 | 6/2012 | Vaswani et al. |
| 2014/0289366 | A1 | 9/2014 | Choi et al. |
| 2015/0163836 | A1 | 6/2015 | Kobayashi et al. |
| 2015/0172289 | A1* | 6/2015 | Kwon .................... H04W 12/08 726/3 |
| 2015/0341899 | A1* | 11/2015 | Irigi ...................... H04W 68/02 455/456.1 |
| 2015/0358773 | A1* | 12/2015 | Huang .................... H04W 4/02 455/456.1 |
| 2016/0284186 | A1* | 9/2016 | Pavlich .................. H04W 24/04 |

FOREIGN PATENT DOCUMENTS

| | | |
|---|---|---|
| TW | 201146032 | 12/2011 |
| WO | 2013002956 | 1/2013 |
| WO | 2013166999 | 11/2013 |

OTHER PUBLICATIONS

"Office Action of Japan Counterpart Application," dated May 9, 2017, p. 1-p. 4, in which the listed reference was cited.

"Office Action of Taiwan Counterpart Application," dated Nov. 28, 2017, p. 1-p. 10, in which the listed references were cited.

* cited by examiner

IDENTITY VERIFICATION METHOD, INTERNET OF THINS GATEWAY DEVICE, AND VERIFICATION GATEWAY DEVICE USING THE SAME

CROSS-REFERENCE TO RELATED APPLICATION

This application claims the priority benefit of U.S. provisional application Ser. No. 62/210,421, filed on Aug. 26, 2015. The entirety of the above-mentioned patent application is hereby incorporated by reference herein and made a part of this specification.

BACKGROUND OF THE INVENTION

Field of the Invention

The invention relates to wireless communications technology, and particularly relates to an identity verification method, an IoT gateway device, and a verification gateway device using the same.

Description of Related Art

The concept of Internet of Things (IoT) made in 1999, refers to RFID, infrared, GPS, laser scanning and other information sensing device wirelessly connected to the Internet through information exchange and communication, intelligent identification, positioning, tracking, monitoring and management further information obtained tentacles extend to the perception layer, so as to achieve a more wide interoperability.

Along with the applications of the IoT technology are being increasingly developed and deployed in commercial, the wireless network security has become a significant concern. Generally speaking, controlling access to wireless data networks is more difficult than controlling access to conventional wired networks. Rogue access points (APs) or rogue client devices can be deployed by hackers that are hard to track down and to locate. In addition, the rogue client device can assault networks with denial of service attacks and gain unauthorized access.

Accordingly, how to verify the identity of the client device and prevent the gateway device from access intrusions, so as to enhance the connection security becomes an important issue to be solved in the IoT technology.

SUMMARY OF THE INVENTION

The invention is directed to an identity verification method, an IoT gateway device, and a verification gateway device using the same, which are capable of resolving the problem mentioned in the related art.

The invention provides an identity verification method adapted for an internet of things (IoT) gateway device. The method includes following steps: establishing a look-up table including a valid media access control (MAC) address list and a valid receiver signal strength indicator (RSSI) range of at least one valid client device; receiving connection request sent from at least one client device, in which the connection request includes a MAC address of the client device; obtaining the MAC address and a RSSI value of the client device according to the connection request; and comparing the MAC address and the RSSI value of the client device with the valid MAC address list and the valid RSSI range, so as to determine whether the client device is the valid client device.

The invention provides an IoT gateway device including a wireless communication circuit, a memory circuit, and a processing unit. The memory circuit stores a plurality of modules. The processing unit is coupled to the wireless communication circuit and the memory circuit, in which the processing unit controls operation of the wireless communication circuit and accesses the memory circuit for executing the modules. The modules include a look-up table establishment module, an information obtaining module, and a verification module. The look-up table establishment module establishes a look-up table including a valid MAC address list and a valid RSSI range of at least one valid client device. The information obtaining module obtains a MAC address and a RSSI value of the client device according to a connection request. The verification module receives the connection request and compares the MAC address and the RSSI value of the client device with the valid MAC address list and the valid RSSI range, so as to determine whether the client device is the valid client device.

The invention provides a verification gateway device including a wireless communication circuit, a memory circuit, and a processing unit. The memory circuit stores a plurality of modules. The processing unit is coupled to the wireless communication circuit and the memory circuit, in which the processing unit controls operation of the wireless communication circuit and accesses the memory circuit for executing the modules. The modules include an authentication module, an information obtaining module, and a notification module. The authentication module receives connection request of the client device and authenticates the client device. The information obtaining module obtains a MAC address and a RSSI value of the client device according to the connection request. The notification module sends a table-adding notification including the MAC address and the RSSI value of the authenticated client device when the client device is authenticated.

According to the above descriptions, the embodiments of the invention provide an identity verification method, an IoT gateway device, and a verification gateway device using the same. By applying the method of the invention, the IoT gateway device may verify the client device further according to the RSSI value. Therefore, even if a rouge client device tries to access the IoT gateway device by faking the valid/legitimate MAC address, the IoT gateway device still can block the invalid client device by verifying the RSSI value of the client device to be connected, so as to enhance the connection security of the IoT system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
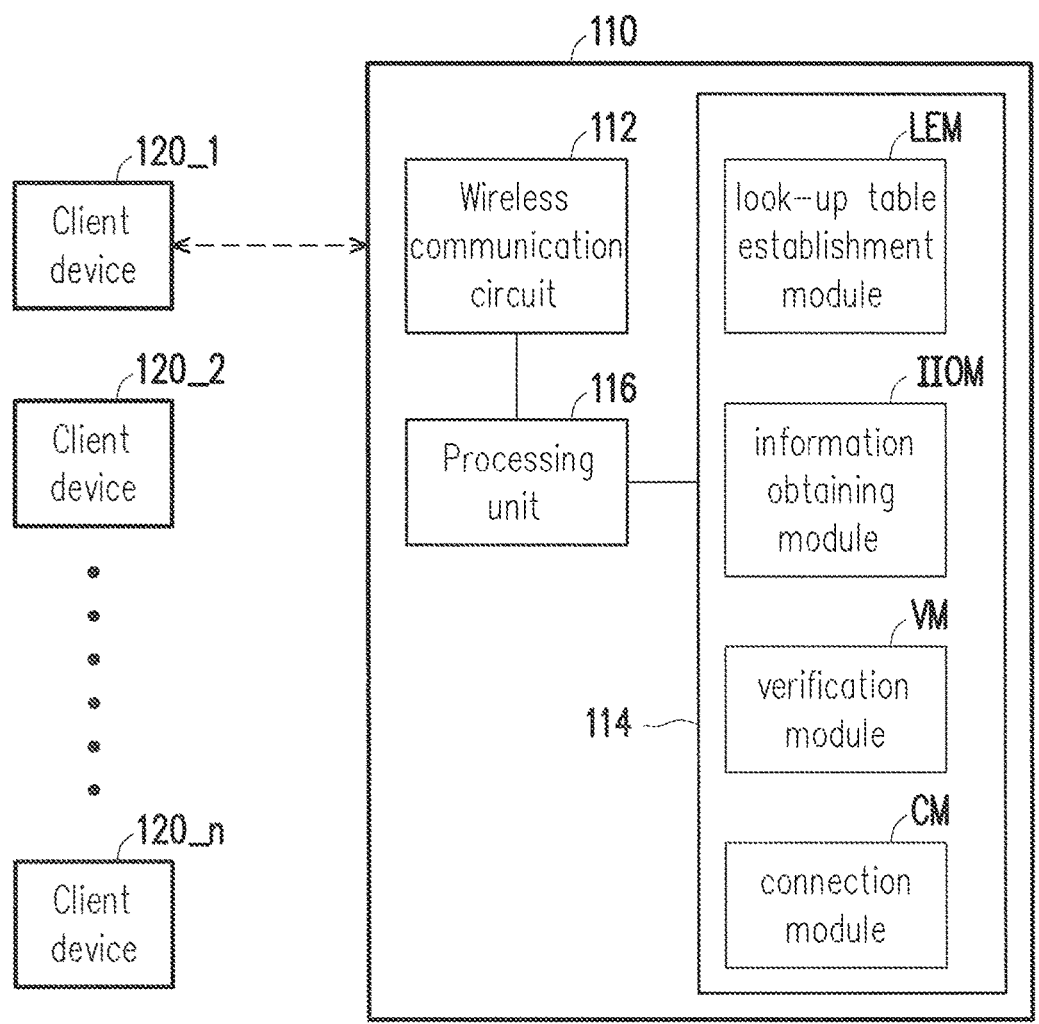
FIG. 1 is a schematic diagram of an IoT system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an IoT system according to an embodiment of the invention. Referring to FIG. 1, the IoT system 100 of the present embodiment includes an IoT gateway device 110 and one or plural client devices 120_1-120_n, in which n is a positive integer.

The IoT gateway device 110 is adapted for providing a wireless network connection service to the client devices 120_1-120_n, so that the client devices 120_1-120_n capable of connecting to the Internet via the IoT gateway device 110. In the application of IoT, the client devices 120_1-120_n may be implemented in general electric equipment, such as an air conditioner, a refrigerator, a vehicle, or a mobile phone. The present invention is not limited thereto.

In the present embodiment, the IoT gateway device 110 includes a wireless communication circuit 112, a memory circuit 114, and a processing unit 116. The communication circuit 112 is coupled to the processing unit 116 for wirelessly connecting to the client devices 120_1-120_n. The communication circuit 112 can be implemented by a wireless transceiver, which supports a wireless communication protocol, such as the Wireless Fidelity (Wi-Fi) protocol.

The memory circuit 114 is coupled to the processing unit 116. It can be a random access memory (RAM), read-only memory (ROM), flash memory, or any other similar components or combination thereof. In the present embodiment, the memory circuit 114 is configured to store a plurality of modules, in which the modules may be programs or applications stored in the memory circuit 114 for providing different functions.

The processing unit 116 is hardware (e.g., a chipset, a processor and set forth) having computing capability for controlling the entire operation of the gateway device 110. In the present exemplary embodiment, the processing unit 116 is, for example, a central processing unit (CPU) or any other programmable microprocessor or digital signal processor (DSP), programmable controller, application specific integrated circuits (ASIC), programmable logic device (PLD) or the like. The processing unit 116 may access the modules stored in the memory circuit 114, so as to execute the functions of the modules.

Specifically, the modules stored in the memory circuit 114 of the IoT gateway device 110 includes a look-up table establishment module LEM, an information obtaining module ROM, a verification module VM, and a connection module CM. The function of said modules may be described later in the part of the identity verification method.

The hardware configuration of each of the client devices 120_1-120_n is similar with the IoT gateway device 110, which includes a wireless communication circuit, a memory circuit, and a processing unit. Each of the client device 120_1-120_n may access the Internet, via the IoT gateway device 110, for uploading data to cloud devices or receiving control commands.

Figure 2:
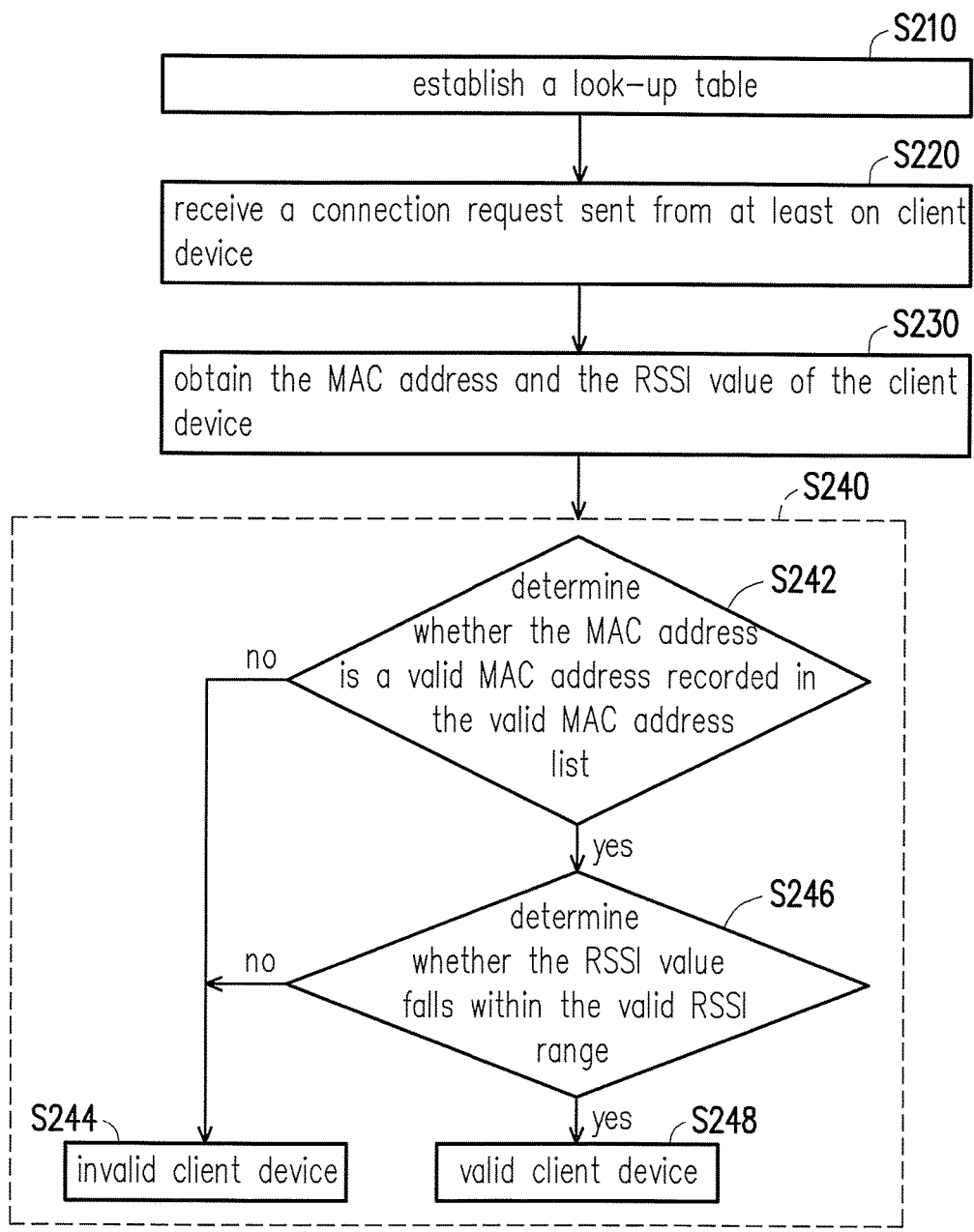
FIG. 2 is a flowchart of an identity verification method according to an embodiment of the invention.

Under the IoT system 100 of the present embodiment, the IoT gateway device 110 may verify the identity of the client device 120_1-120_n by applying the method illustrating in FIG. 2, in which steps of the method are executed by the IoT gateway device 110 by accessing the modules stored in the memory circuit 114. FIG. 2 is a flowchart of an identity verification method according to an embodiment of the invention.

Referring to FIG. 1 and FIG. 2, in step S210, the look-up table establishment module LEM is executed for establishing a look-up table, in which the look-up table includes a valid media access control (MAC) address list and a valid receiver signal strength indicator (RSSI) range of at least one valid client device.

In step S220, the verification module VM is executed for receiving a connection request sent from at least one client device 120_1-120_n, in which the connection request includes a MAC address of the client device.

In step S230, the information obtaining module IIOM is executed for obtaining the MAC address and a RSSI value of the client device 120_1-120_n according to the connection request.

After the RSSI value of the client device 120_1-120_n to be verified has been obtained, in step S240, the verification module VM is executed for comparing the MAC address and the RSSI value of the client device 120_1-120_n with the valid MAC address list and the valid RSSI range, so as to determine whether the client device 120_1-120_n is the valid client device.

More specifically, during step S240, the verification module VM may determine whether the MAC address of the client device 120_1-120_n is a valid MAC address recorded in the valid MAC address list (step S242). If the MAC address of the client device 120_−1-120_n is not recorded in the valid MAC address list of the look-up table, the client device 120_1-120_n is determined to be an invalid client device (step S244). In contrast, if the MAC address of the client device 120_1-120_n is recorded in the valid MAC address list of the look-up table, the MAC address of the client device 120_1-120_n may be determined to be the valid MAC address and the verification module VM may further determine whether the RSSI value of the client device 120_1-120_n falls within the valid RSSI range (step S246).

In step S246, if the RSSI value of the client device 120_1-120_n falls without the valid RSSI range, the client device 120_1-120_n is determined to be the invalid client device (step S244). In contrast, if the RSSI value of the client device 120_1-120_n falls within the valid RSSI range corresponding to a specific valid MAC address, the RSSI value may be determined to be the valid RSSI value and the client device 120_1-120n may be determined to be the valid client device (step S248).

If the client device 120_1-120_n is determined to be the valid client device, the connection module VM may be executed for authenticating access information of the client device 120_1-120_n and then allowing/acknowledging the connection request of the client device 120_1-120n after the access information is authenticated. The wireless connection WC between the client device 120_−1-120_n and the IoT gateway device 110 is established after the connection request is allowed/acknowledged.

In the present embodiment, the wireless connection WC is, for example, a Wi-Fi connection, which is established based on Wi-Fi Protected Access (WPA) protocol or Wi-Fi Protected Access2 (WPA2) protocol. That is, step of performing four-way handshake between the client device 120_1 and the gateway device 110 may be applied after step S248. The present invention is not limited thereto.

In contrast, if the client device 120_1-120_n is determined to be the invalid client device, the connection module CM may deny the connection request of the client device 120_1-120_n.

In other words, during the identity verification method of the present embodiment, the client device 120_1-120_n is merely determined to be the valid client device when the MAC address and the RSSI value are both determined to be valid. Therefore, even if a rouge client device tries to access the IoT gateway device 110 by faking the valid/legitimate MAC address, the IoT gateway device 110 may identify the rouge client device as the invalid client device and block the invalid client device by verifying the RSSI value, so as to enhance the connection security of the IoT system 100.

Figure 3:
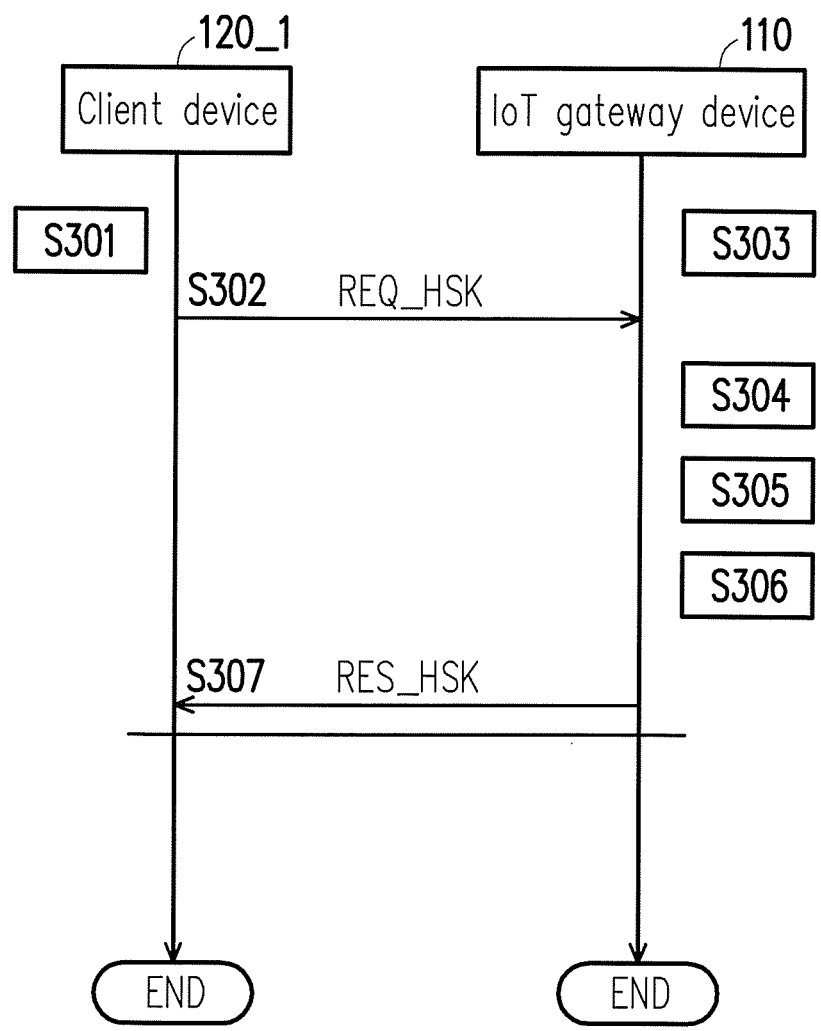
FIG. 3 is a schematic flowchart illustrating a process of verifying a client device according to an embodiment of the invention based on the IoT system illustrated in FIG. 1.
Figure 4:
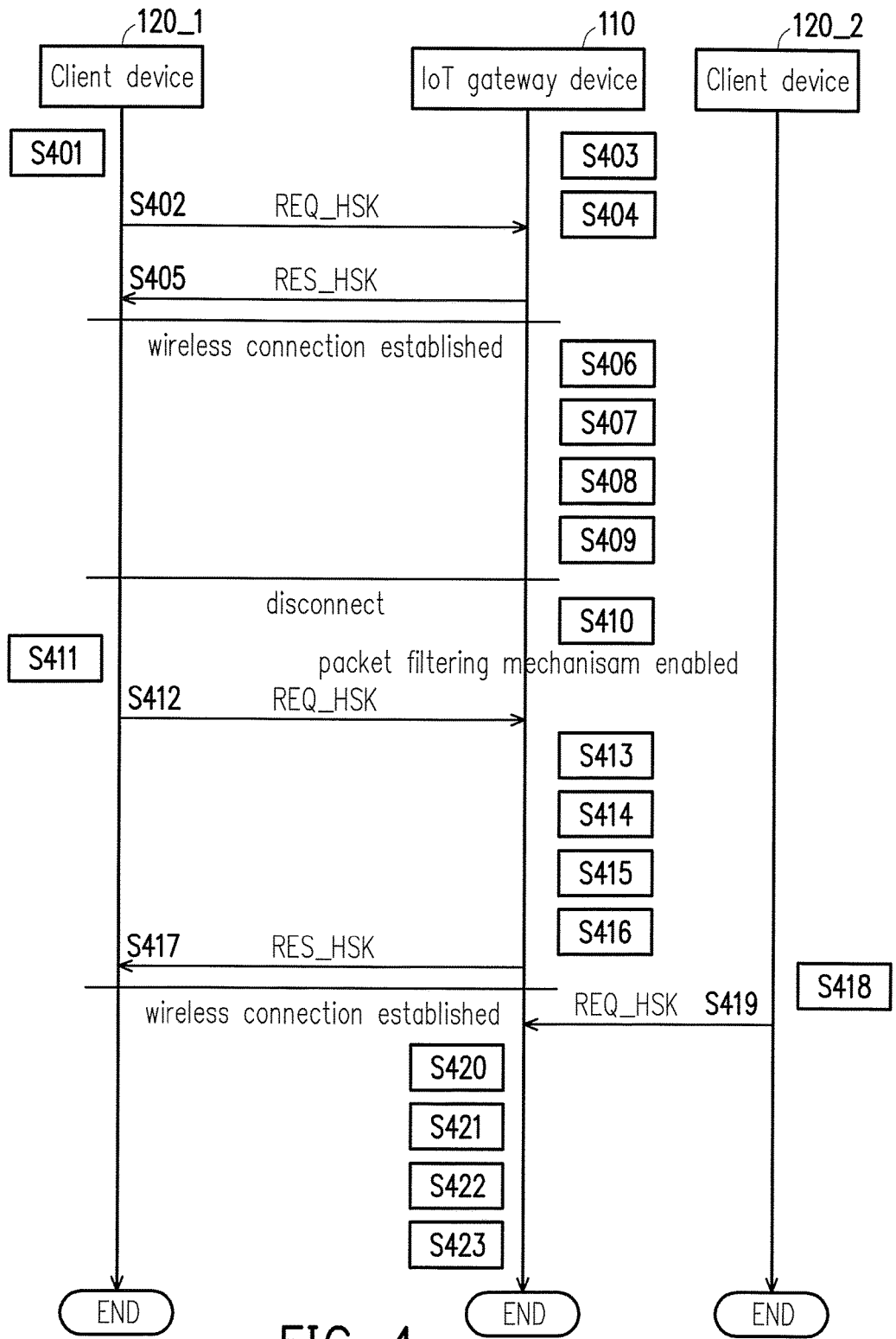
FIG. 4 is a schematic flowchart illustrating a process of verifying a client device according to another embodiment of the invention based on the IoT system illustrated in FIG. 1.

FIG. 3 and FIG. 4 schematically illustrate processes of verifying a client device according to different embodiments of the invention based on the IoT system illustrated in FIG. 1 to further elaborate the identity verification method.

The interaction between the client device 120 and the IoT gateway 110 device 110 is taken as an example to be illustrated below for describing the identity verification method, in which the client device 120 can be interpreted as any one of the client device 120_1-120n illustrating in FIG. 1. Herein, the client device 120 is assumed to be the valid client device, in which the MAC address and the RSSI value are recorded in the look-up table of the IoT gateway device 110.

Besides, the client device 120 is assumed to be disposed at a specific position having a specific relative positional relationship with the IoT gateway device 110, so that the IoT gateway device 110 may obtain, during each connection, the approximative RSSI value according to the signal received from the client device 120.

Referring to FIG. 3, the client device 120 starts to connect to the IoT gateway device 110 with an access password, which is manually typed or automatically acquired (step S301). During step S301, the client device 120 sends a connection request REQ_HSK including the MAC address to the IoT gateway device 110 (step S302).

In view of the IoT gateway device 110, after step S302, the IoT gateway device 110 may receive the connection request REQ_HSK including the MAC address (step S303) and obtain the MAC address and the RSSI value of the client device 120 according to the connection request (step S304). For example, the IoT gateway device 110 may acquire a specific fragment from the string of the connection request REQ_HSK, so as to obtain the MAC address. Besides, the RSSI value can be calculated according to the of the signal power received from the client device 120.

After the IoT gateway device 110 obtains the MAC address and the RSSI value of the client device 120, the IoT gateway device 110 determines whether the MAC address and the RSSI value of client device 120 are valid (step S305).

In the present embodiment, it's assumed that the MAC address of "00:de:a2:de:ba:ff" is already recorded in the valid MAC address list. The valid RSSI range is set to be −75 dB to −70 dB corresponding to the MAC address of "00:de:a2:de:ba:ff". Therefore, in step S305, the IoT gateway device 110 may determine whether the MAC address obtained in step S304 is the valid MAC address recorded in the valid MAC address list. For example, if the MAC address obtained in step S304 is "00:df:ab:de:0a:ff" which is not recorded in the valid MAC address list, the IoT gateway device 110 may determine the client device 120 is invalid and deny the connection request REQ_HSK.

In contrast, if the MAC address obtained in step S304 is "00:de:a2:de:ba:ff" which is the valid MAC address, the IoT gateway device 110 may further determine whether the RSSI value obtained in step S304 is the valid RSSI value fell within the valid RSSI range. For example, if the RSSI value obtained in step S304 is −40 dB which falls out the range of −75 dB to −70 dB, the IoT gateway device 110 may determine the client device 120 is invalid, even if the MAC address is valid (the MAC address might be faked in this situation), and deny the connection request REQ_HSK. In addition, if the RSSI value obtained in step S304 is −72 dB which falls within the range of −75 dB to −70 dB, the IoT gateway device 110 may determine the client device 120 is valid.

In the present embodiment, the IoT gateway device 110 may determine the client device 120 is the valid client device in step S305 and further checks whether the access password is correct according to the connection request REQ_HSK after the identity of the client device 120 is verified, so as to authenticate the client device 120 (step S306). The gateway device 110 sends a connection response RES_HSK back to the client device 120 when the client device 120 is authenticated (step S307), so as to notify the client device 120 that the connection request REQ_HSK has been acknowledged. The wireless connection WC between the client device 120 and the gateway device 110 is established after step S307. It should be noted that, in the practical application, the steps of authenticating whether the access password is correct (steps S302, S306, and S307) can be implemented by four way handshake algorithm, after the RSSI value and the MAC address are verified to be valid.

According to the method described in the present embodiment, the client device 120 passes the verification only when both of the MAC address and the RSSI value are determined to be valid. That is to say, when a rouge client device try to access the IoT gateway device 110 with fake MAC address, the rouge client device can be blocked by filtering the RSSI value, so as to enhance the connection security of the IoT system 100.

It should be noted that, in an exemplary embodiment, said identity verification method can be regularly applied in the IoT gateway device 110 when operating. In this case, the look-up table stored in the IoT gateway device 110 can be preset by the user.

In another exemplary embodiment, said identity verification method also can be applied when a specific condition is fulfilled. Specifically, the IoT gateway device 110 is operated in a normal state before the specific condition is fulfilled. Once the specific condition is fulfilled (e.g., an attack is detected by the IoT gateway device 110, but the present invention is not limited thereto), the IoT gateway device 110 may activate a packet filtering mechanism for executing the aforementioned identity verification method and filtering packets sent from the invalid client device.

On the other hand, during the normal state, the IoT gateway device 110 may authenticate the client device 120 by general authentication means, such as executing four way handshake for authenticating the access password, and thus the authenticated client device 120 establishes the wireless connection WC with the IoT gateway device 110. In this case, the look-up table can be established, during the normal state, according to the MAC address and the RSSI value of the authenticated client device. The process illustrating in FIG. 4 is taken as an example to be illustrated below for describing the exemplary embodiment.

FIG. 4 is a schematic flowchart illustrating a process of verifying a client device according to another embodiment of the invention based on the IoT system illustrated in FIG. 1. In the present embodiment, it's assumed that the client device 120_1 and client device 120_2 are operated by legitimate user, but the MAC address and the RSSI value of the client devices 120_1 and 120_2 are not registered in the look-up table of the IoT device 110 yet. In addition, the IoT gateway device 110 is preset to the normal state.

Referring to FIG. 4, the client device 120_1 starts to connect to the IoT gateway device 110 (step S401). During step S401, the client device 120_1 sends a connection request REQ_HSK including the MAC address to the IoT gateway device 110 (step S402).

In view of the IoT gateway device 110, after step S402, the IoT gateway device 110 may receive the connection request REQ_HSK including the MAC address (step S403). The IoT gateway device 110 may check whether the access password is correct according to the connection request REQ_HSK, so as to authenticate the client device 120_1 (step S404).

After the client device 120_1 is authenticated, the gateway device 110 sends a connection response RES_HSK back to the client device 120_1, so as to notify the client device 120_1 that the connection request REQ_HSK has been acknowledged (step S405). The wireless connection WC between the client device 120 and the gateway device 110 is established after step S405. It should be noted that, in the practical application, the steps of authenticating whether the access password is correct (steps S402, S404, and S405) can be implemented by four way handshake algorithm.

After the wireless connection WC is established, the IoT gateway device 110 obtains the MAC address and the RSSI value of the client device 120_1 according to the signal received from the client device 120_1 (step S406) and adds the MAC address of the client device 120_1 into the valid MAC address list of the look-up table stored in the IoT gateway device 110 (step S407).

Next, the IoT gateway device 110 calculates a RSSI range based on the RSSI value obtained from the client device 120_1 (step S408) and adds the calculated RSSI range into the look-up table as the valid RSSI range corresponding to the MAC address of the client device 120_1 (step S409). In the present embodiment, the RSSI range can be designed as RSSI±x %, in which x can be designed by the designer. Accordingly, the valid MAC address and the valid RSSI value of the client device 120_1 have been added into the look-up table.

In the present embodiment, the IoT gateway device 110 may determine whether the number of received connection requests exceeds a threshold within a preset period. The IoT gateway device 110 activates the packet filtering mechanism when the number of the received connection requests exceeds the threshold within the preset period (step S410). The IoT gateway device 110 may suspend from newly adding the MAC address and the RSSI range into the look-up table after the packet filtering mechanism is activated. In other words, after the packet filtering mechanism is activated, the IoT gateway device 110 only allows the connection request sent from the valid client devices recorded in the look-up table.

Specifically, if the client device 120_1 requests for connecting to the IoT gateway device 110 again during the packet filtering mechanism is activated and sends the connection request REQ_HSK to the IoT gateway device 110 (step S411 and S412), the IoT gateway device 110 may execute step S413 to step S416, similar with step S303 to step S306 described in the prior embodiment, for verifying the identity of the client device 120_1 and authenticating the access information of the client device 120_1.

In the present embodiment, the client device 120_1 is determined to be the valid client device since the MAC address and the RSSI value are already recorded in the look-up table before the packet filtering mechanism is activated. Therefore, the IoT gateway device 110 may send the connection response RES_HSK back to the client device 120_1 for establishing the wireless connection WC with the client device 120_1 (step S417).

On the other hand, if the client device 120_2 requests for connecting to the IoT gateway device 110 during the packet filtering mechanism is activated and sends the connection request REQ_HSK to the IoT gateway device 110 (step S418 and S419), the IoT gateway device 110 may determine the client device 120_2 is the invalid client device since the MAC address and the RSSI are not recorded in the look-up table according to step S420 to step S422, so as to deny the connection request REQ_HSK of the client device 120_2 (step S423). In other words, in the present embodiment, the connection request REQ_HSK sent from the client device 120_2 may be rejected by the IoT gateway device 110 when the packet filtering mechanism is activated.

It should be noted that, in the present embodiment, once the IoT gateway device 110 activates the packet filtering mechanism, the client device 120_2 which is not recorded in the look-up table cannot connect to the IoT gateway device 110 even if the client device 120_2 is actually valid.

Figure 5:
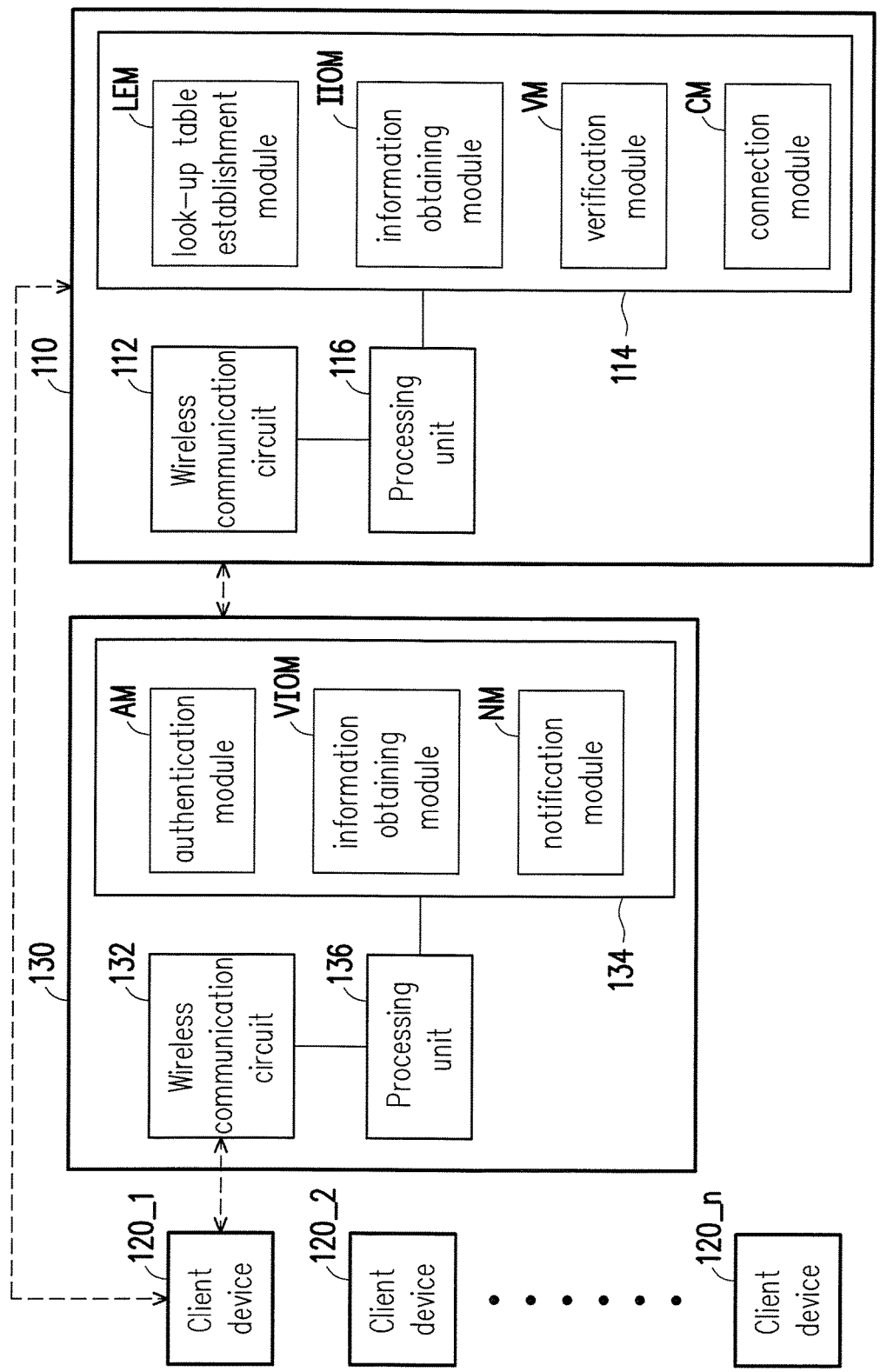
FIG. 5 is a schematic diagram of an IoT system according to another embodiment of the invention.

FIG. 5 is a schematic diagram of an IoT system according to another embodiment of the invention. Referring to FIG. 5, the IoT system 500 of the present embodiment includes an IoT gateway device 110, one or plural client device 120_1-120_n, and a verification gateway device 130.

The IoT gateway device 110 and the client device 120__1-120_n are basically similar with the embodiment illustrating in FIG. 1. Main difference between the present embodiment and the previous embodiment is that the IoT system 500 further provides a verification gateway device 130 for verifying the identity of the client device 120_1-120_n, so as to provide the information related to the MAC address and the RSSI value of the valid client device to the IoT gateway device 110. Therefore, the IoT gateway device 110 can add a new entry, consisting of the MAC address and the RSSI value, into the look-up table according to the information provided by the verification gateway device 130 even when the packet filtering mechanism is activated.

Specifically, the verification gateway device 130 includes a wireless communication circuit 132, a memory circuit 134, and a processing unit 136. The hardware configuration of the verification gateway device 130 is similar with the IoT gateway device 110, which are omitted to describe herein for simplicity.

The modules stored in the memory circuit 134 of the verification gateway device 130 include an authentication module AM, information obtaining module VIOM, and a notification module NM. The authentication module AM is executed for receiving the connection request of the client device 120__1-120_n and authenticating the client device 120_1-120_n. The information obtaining module VIOM is executed for obtaining the MAC address and the RSSI value of the client device 120_1-120_n according to the connection request. The notification module is executed for sending a table-adding notification including the MAC address and the RSSI value of the authenticated client device when the client device is authenticated.

Figure 6:
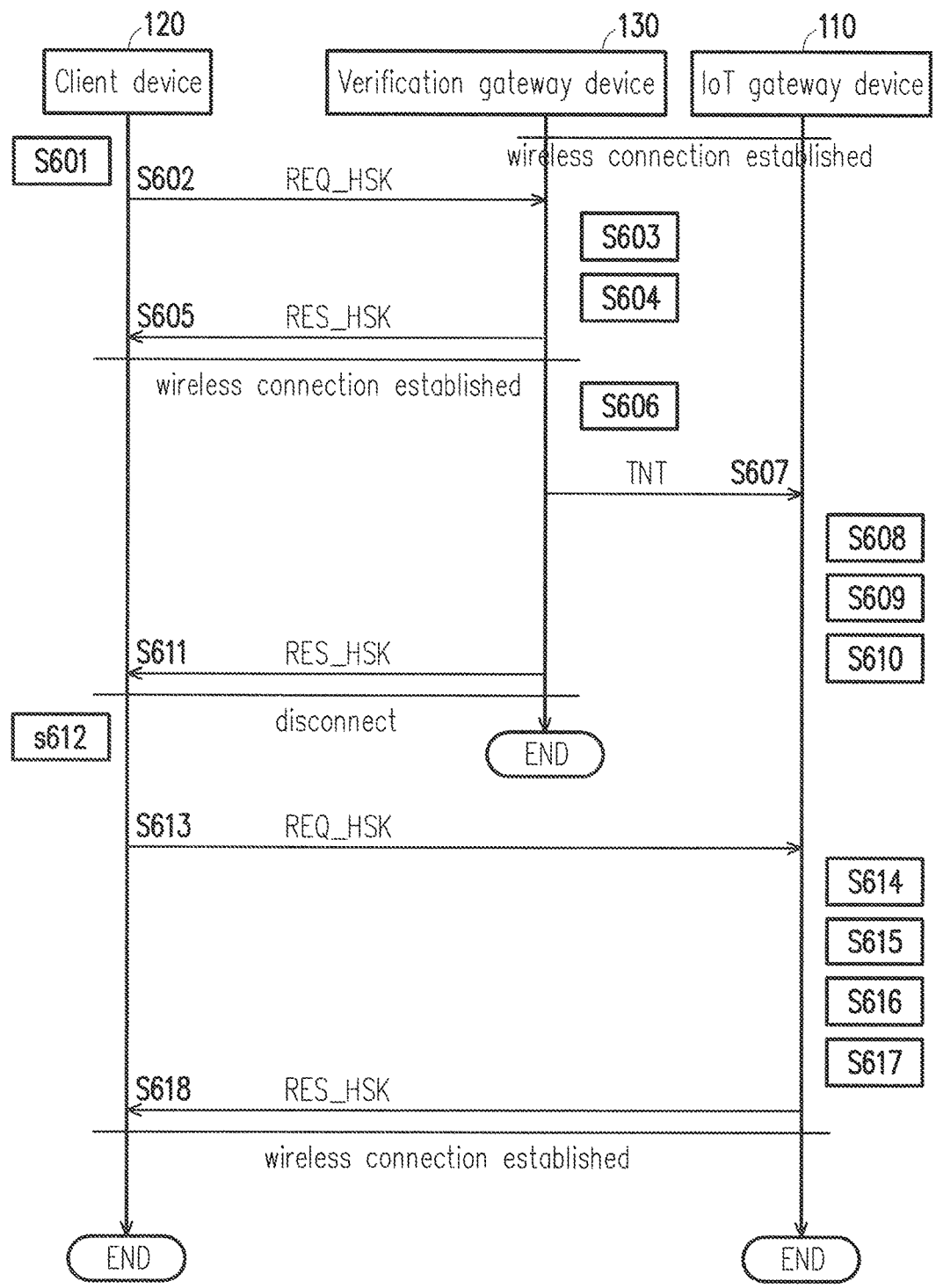
FIG. 6 is a schematic flowchart illustrating a process of verifying a client device according to an embodiment of the invention based on the IoT system illustrated in FIG. 5.

FIG. 6 is a schematic flowchart illustrating a process of verifying a client device according to an embodiment of the invention based on the IoT system illustrated in FIG. 5.

Referring to FIG. 6, the present embodiment illustrates a situation of a valid client device 120, having the correct access password, is trying to connect to the IoT gateway device 110, in which a wireless connection between the IoT gateway device 110 and the verification gateway device 130 has already been established.

In step S601, the client device 120 may firstly connect to the verification gateway device 130. During step S601, the client device 120 sends a connection request REQ_HSK including the MAC address to the verification gateway device 130 (step S602).

In view of the verification gateway device 130, after step S602, the verification gateway device 130 may receive the connection request REQ_HSK including the MAC address (step S603). The verification gateway device 130 may check whether the access password is correct according to the connection request REQ_HSK, so as to authenticate the client device 120_1 (step S604).

After the client device 120 is authenticated, the verification gateway device 130 sends a connection response RES_HSK back to the client device 120, so as to notify the client device 120 that the connection request REQ_HSK has been acknowledged (step S605) and the wireless connection is established. It should be noted that, in the practical application, the steps of authenticating whether the access password is correct (steps S602, S604, and S605) can be implemented by four way handshake algorithm.

After the wireless connection WC is established, the verification gateway device 130 obtains the MAC address and the RSSI value of the client device 120 according to the signal received from the client device 120 (step S606) and sends the table-adding notification TNT to the IoT gateway device 110 (step S607). The IoT gateway device 110 may add the MAC address of the table-adding notification TNT into the valid MAC address list (step S608), calculate a RSSI range based on the RSSI value of the table-adding notification TNT (step S609), and add the calculated RSSI range into the look-up table as the valid RSSI range corresponding to the MAC address of the table-adding notification TNT (step S610).

The verification gateway device 130 sends a reconnection notification RNT to the client device 120 (step S611), such that the client device 120 disconnect to the verification gateway device 130 and reconnect to the IoT gateway device 110 (step S612).

Next, the client device 120 may send the connection request REQ_HSK to the IoT gateway device 110 (step S613), so that the IoT gateway device 110 executes step S614 to step S617, similar with step S303 to step S306 described in the prior embodiment, for verifying the identity of the client device 120_1 and authenticating the access information of the client device 120. Note that, for the first connection of the valid client device 120, the IoT gateway device 110 may readjust the received RSSI value which is more accurate compared to the RSSI value sent by the verification gateway device 130.

In other words, the IoT gateway device 110 of the present embodiment can be regarded as continuously activating the packet filtering mechanism when operated. However, unlike the embodiment depicted in FIG. 4, the IoT gateway device 110 of the present embodiment may add the valid client device 120 connecting to the IoT gateway device 110 for the first time by using the verification gateway device 130 for verifying the client device 120 and providing the notification related to the information of the valid client device 110 to the IoT gateway device 110. Therefore, the issue, of the valid client device may be blocked for the first connection, can be solved.

To sum up, the embodiments of the invention provide an identity verification method, an IoT gateway device, and a verification gateway device using the same. By applying the method of the invention, the IoT gateway device may verify the client device further according to the RSSI value. Therefore, even if a rouge client device tries to access the IoT gateway device by faking the valid/legitimate MAC address, the IoT gateway device still can block the rouge/invalid client device by verifying the RSSI value of the client device to be connected, so as to enhance the connection security of the IoT system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An identity verification method, adapted for an internet of things (IoT) gateway device, comprising:
   establishing a look-up table comprising a valid media access control (MAC) address list and a valid receiver signal strength indicator (RSSI) range of at least one valid client device by an IoT gateway device;
   receiving connection request sent from at least one client device by the IoT gateway device, wherein the connection request comprises a MAC address of the client device;
   obtaining the MAC address and a RSSI value of the client device by the IoT gateway device according to the connection request;
   comparing the MAC address and the RSSI value of the client device with the valid MAC address list and the valid RSSI range by the IoT gateway device;
   determining the client device is the valid client device by the IoT gateway device if the MAC address is determined to be the valid MAC address and the RSSI value falls within the valid RSSI range;
   if the client device is the valid client device, establishing a wireless connection by the IoT gateway device; and
   if the client device is not the valid client device, rejecting the connection request and blocking the client device by the IoT gateway device.

2. The identity verification method of claim 1, wherein the step of comparing the MAC address and the RSSI value with the valid MAC address list and the valid RSSI range by the IoT gateway device comprises:
   determining whether the MAC address of the client device is a valid MAC address recorded in the valid MAC address list by the IoT gateway device; and
   determining whether the RSSI value of the client device falls within the valid RSSI range corresponding to the valid MAC address by the IoT gateway device.

3. The identity verification method of claim 1, wherein the step of establishing the look-up table comprising the valid MAC address list and the valid RSSI range of the valid client device by the IoT gateway device comprises:
   adding a MAC address of an authenticated client device into the valid MAC address list by the IoT gateway device;

calculating a RSSI range based on a RSSI value of the authenticated client device by the IoT gateway device; and adding the calculated RSSI range into the look-up table as the valid RSSI range corresponding to the MAC address of the authenticated client device by the IoT gateway device.

4. The identity verification method of claim 3, further comprising:

determining whether the number of the connection requests exceeds a threshold by the IoT gateway device, wherein the connection requests are received by the IoT gateway device within a preset period; and activating a packet filtering mechanism by the IoT gateway device when the number of the connection requests exceeds the threshold.

5. The identity verification method of claim 4, wherein the step of activating the packet filtering mechanism by the IoT gateway device when the number of the connection requests exceeds the threshold comprises:

suspending the IoT gateway device from adding a new entry, consisting comprising a MAC address and a RSSI range, into the look-up table by the IoT gateway device.

6. The identity verification method of claim 4, further adapted for a verification gateway device, wherein the step of activating the packet filtering mechanism by the IoT gateway device when the number of the connection requests exceeds the threshold comprises:

receiving the connection request by the verification gateway device, so as to authenticate the client device; and sending a table-adding notification comprising the MAC address and the RSSI value of the authenticated client device to the IoT gateway device, wherein the IoT gateway device merely allows the MAC address and the RSSI range received from the table-adding notification to be added into the look-up table when the packet filtering mechanism is activated.

7. The identity verification method of claim 6, wherein the step of activating the packet filtering mechanism by the IoT gateway device when the number of the connection requests exceeds the threshold further comprises:

sending a reconnection notification to the client device by the IoT gateway device, wherein the client device reconnects to the IoT gateway device in response to the reconnection notification.

8. An IoT gateway device, adapted for providing a wireless network connection service to at least one client device, comprising:

a wireless communication circuit;
a memory circuit, storing a plurality of modules; and
a processing unit, coupled to the wireless communication circuit and the memory circuit, wherein the processing unit controls operation of the wireless communication circuit and accesses the memory circuit for executing the modules, and the modules comprises:

a look-up table establishment module, establishing a look-up table comprising a valid MAC address list and a valid RSSI range of at least one valid client device;

an information obtaining module, obtaining a MAC address and a RSSI value of the client device according to a connection request;

a verification module, receiving the connection request and comparing the MAC address and the RSSI value of the client device with the valid MAC address list and the valid RSSI range, determining the client device is the valid client device if the MAC address is determined to be the valid MAC address and the RSSI value falls within the valid RSSI range; and a connection module, establishing a wireless connection if the client device is the valid client device, and rejecting the connection request and blocking the client device if the client device is not the valid client device.

9. The IoT gateway device of claim 8, wherein the verification module determines whether the MAC address of the client device is a valid MAC address recorded in the valid MAC address list and the RSSI value of the client device is within the valid RSSI range corresponding to the valid MAC address, wherein the verification module determines the client device is the valid client device when the MAC address is determined to be the valid MAC address and the RSSI value is within the valid RSSI range.

10. The IoT gateway device of claim 8, wherein the look-up table establishment module adds a MAC address of an authenticated client device into the valid MAC address list and adds a RSSI range of the authenticated client device into the look-up table as the valid RSSI range corresponding to the MAC address of the authenticated client device, wherein the RSSI range is calculated, by the information obtaining module, based on a RSSI value of the authenticated client device.

11. The IoT gateway device of claim 10, wherein the verification module further determines whether a number of the connection request exceeds a threshold within a preset period, so as to activate a packet filtering mechanism when the number of the connection requests exceeds the threshold.

12. The IoT gateway device of claim 11, wherein when the packet filtering mechanism is activated, the verification module suspends the look-up table establishment module from newly adding the MAC address and the RSSI range into the look-up table.

13. The IoT gateway device of claim 11, wherein when the packet filtering mechanism is activated, the look-up table establishment module merely adds the MAC address and the RSSI range of the client device according to a table-adding notification received from a verification gateway device.

14. A verification gateway device, adapted to verify at least one client device for an IoT gateway device, comprising:

a wireless communication circuit;
a memory circuit, storing a plurality of modules; and
a processing unit, coupled to the wireless communication circuit and the memory circuit, wherein the processing unit controls operation of the wireless communication circuit and accesses the memory circuit for executing the modules, and the modules comprise:

an authentication module, receiving connection request of the client device and authenticating the client device;

an information obtaining module, obtaining a MAC address and a RSSI value of the client device according to the connection request; and a notification module, sending a table-adding notification comprising the MAC address and the RSSI value of the authenticated client device to a IoT gateway device when the client device is authenticated, so as to determine the client device is valid client device if the MAC address is determined to be the valid MAC address and the RSSI value falls within the valid RSSI range by the IoT gateway device, where the MAC address and the RSSI value is belonged to the connection request received by the IoT gateway device.

15. The verification gateway device of claim 14, wherein the notification module further sends a reconnection notification to the client device.

\* \* \* \* \*